US012521099B2

(12) United States Patent
Muramatsu et al.

(10) Patent No.: US 12,521,099 B2
(45) Date of Patent: Jan. 13, 2026

(54) ULTRASONIC DIAGNOSTIC SYSTEM

(71) Applicant: KONICA MINOLTA, INC., Tokyo (JP)

(72) Inventors: Yuki Muramatsu, Saitama (JP); Morio Nishigaki, Fujisawa (JP)

(73) Assignee: KONICA MINOLTA, INC., Tokyo (JP)

( * ) Notice: Subject to any disclaimer, the term of this patent is extended or adjusted under 35 U.S.C. 154(b) by 52 days.

(21) Appl. No.: 18/408,731

(22) Filed: Jan. 10, 2024

(65) Prior Publication Data

US 2024/0268794 A1 Aug. 15, 2024

(30) Foreign Application Priority Data

Feb. 13, 2023 (JP) ................................ 2023-020017

(51) Int. Cl.
*A61B 8/00* (2006.01)

(52) U.S. Cl.
CPC .............. *A61B 8/56* (2013.01); *A61B 8/4427* (2013.01)

(58) Field of Classification Search
CPC ................................ A61B 8/56; A61B 8/4427
See application file for complete search history.

(56) References Cited

U.S. PATENT DOCUMENTS

| | | | | |
|---|---|---|---|---|
| 9,579,086 | B2 | 2/2017 | Satsuka et al. | |
| 2015/0297192 | A1* | 10/2015 | Chamberlain ....... | A61B 8/4427 600/443 |
| 2017/0179774 | A1* | 6/2017 | Jin ........................... | A61B 8/56 |
| 2020/0297325 | A1* | 9/2020 | Kazui ...................... | A61B 8/56 |

FOREIGN PATENT DOCUMENTS

| | | |
|---|---|---|
| JP | 2014213028 A | 11/2014 |

* cited by examiner

*Primary Examiner* — Alexei Bykhovski
(74) *Attorney, Agent, or Firm* — Holtz, Holtz & Volek PC

(57) ABSTRACT

An ultrasonic diagnostic system includes: a plurality of batteries that functions as a power source of an ultrasonic diagnostic apparatus; and a hardware processor that switches and executes individual charging of the plurality of batteries.

8 Claims, 12 Drawing Sheets

ULTRASONIC DIAGNOSTIC SYSTEM

The entire disclosure of Japanese patent Application No. 2023-020017, filed on Feb. 13, 2023, is incorporated herein by reference in its entirety.

BACKGROUND

Technological Field

The present invention relates to an ultrasonic diagnostic system.

Description of the Related Art

In recent years, there is an ultrasonic diagnostic system having portability that allows a user to easily carry the ultrasonic diagnostic system to a place where ultrasonic diagnosis is performed. Such an ultrasonic diagnostic system can also operate by power supply from a battery instead of power supply from an external power supply.

However, in a portable ultrasonic diagnostic system that operates by power supply from a battery, the capacity of the power supply is limited. Therefore, the time that can be used for diagnosis is shorter than that of a stationary ultrasonic diagnostic system in which a larger battery having a large capacity is generally mounted. When the remaining capacity of the battery becomes insufficient during the diagnosis, the diagnosis is interrupted, and the setting and the like used for the diagnosis are reset. Even if the ultrasonic diagnostic system is connected to another power supply and reactivated, a large amount of labor may be required because resetting or diagnosis is performed again in order to restart diagnosis or the like. In preparation for such a case, for example, JP 2014-213028 A discloses a technique for preventing a remaining capacity shortage of a battery during diagnosis in order to prevent a situation that requires a large amount of labor.

JP 2014-213028 A proposes preparation of a plurality of batteries as a method for preventing shortage of the remaining capacity of the battery during diagnosis. Normally, the ultrasonic diagnostic system operates by power supply from a relatively large capacity external battery. Then, in a case where the remaining capacity of the external battery is insufficient, the ultrasonic diagnostic system operates by power supply from a relatively small capacity built-in battery built in the ultrasonic diagnostic system in advance. That is, the technique described in JP 2014-213028 A is a power supply control method for supplying power from a plurality of batteries to an ultrasonic diagnostic system while switching a battery to be discharged.

However, J P 2014-213028 A does not describe charge control for a plurality of prepared batteries. If the charge control for the plurality of batteries is not performed, there is a possibility that power supply from the plurality of batteries to the ultrasonic diagnostic apparatus cannot be necessarily performed efficiently. Therefore, the conventional power supply control method described in JP 2014-213028 A has a certain limit in terms of improving utilization efficiency of a plurality of batteries prepared as a power source of an ultrasonic diagnostic apparatus.

SUMMARY

An object of the present invention is to provide an ultrasonic diagnostic system capable of efficiently charging a plurality of batteries prepared as a power source of an ultrasonic diagnostic apparatus.

To achieve the abovementioned object, according to an aspect of the present invention, an ultrasonic diagnostic system reflecting one aspect of the present invention comprises: a plurality of batteries that functions as a power source of an ultrasonic diagnostic apparatus; and a hardware processor that switches and executes individual charging of the plurality of batteries.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

<External Configuration of Ultrasonic Diagnostic System 100>

Figure 1:
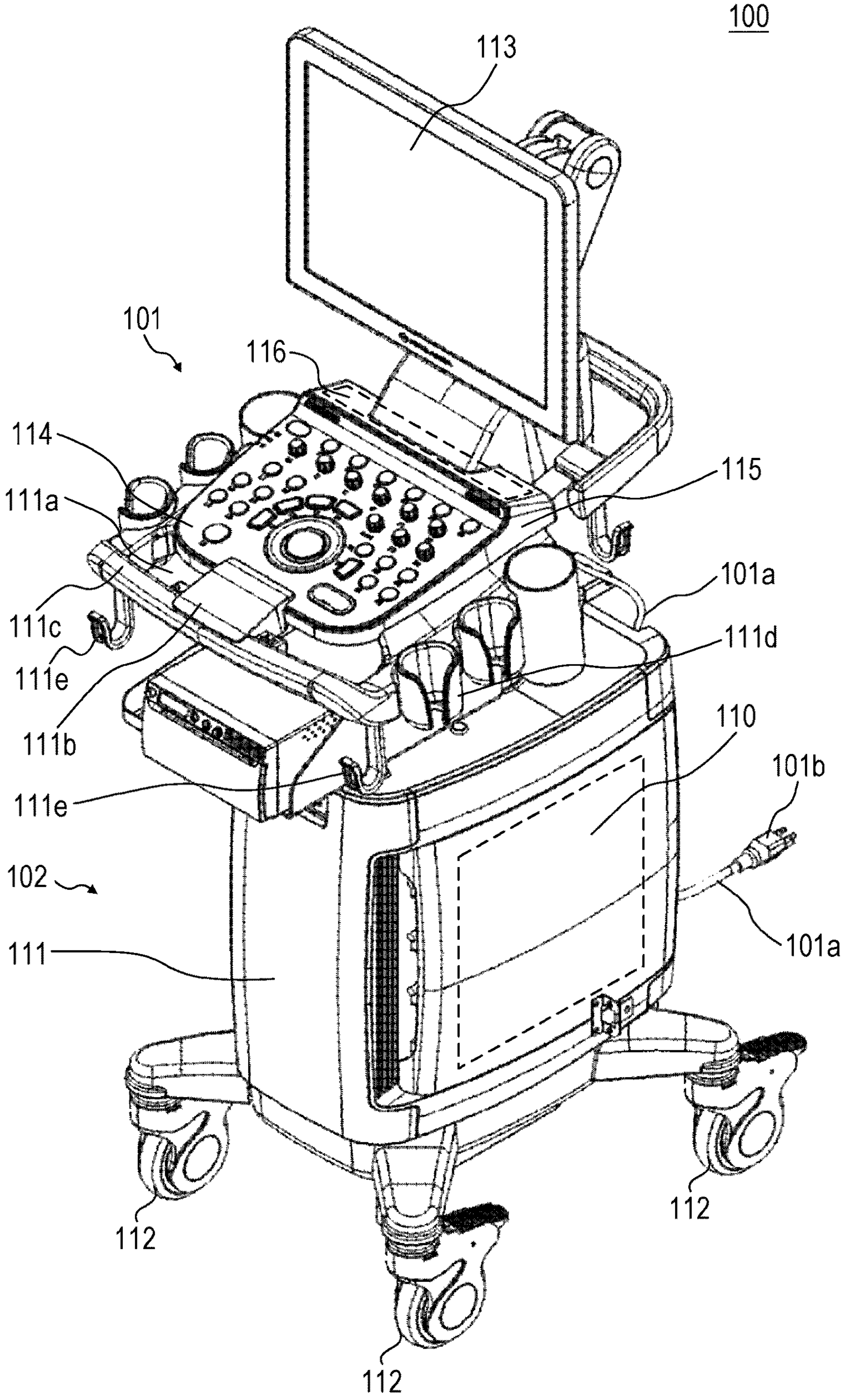
FIG. 1 is an external perspective view illustrating a front surface of an ultrasonic diagnostic system according to an embodiment.
Figure 2:
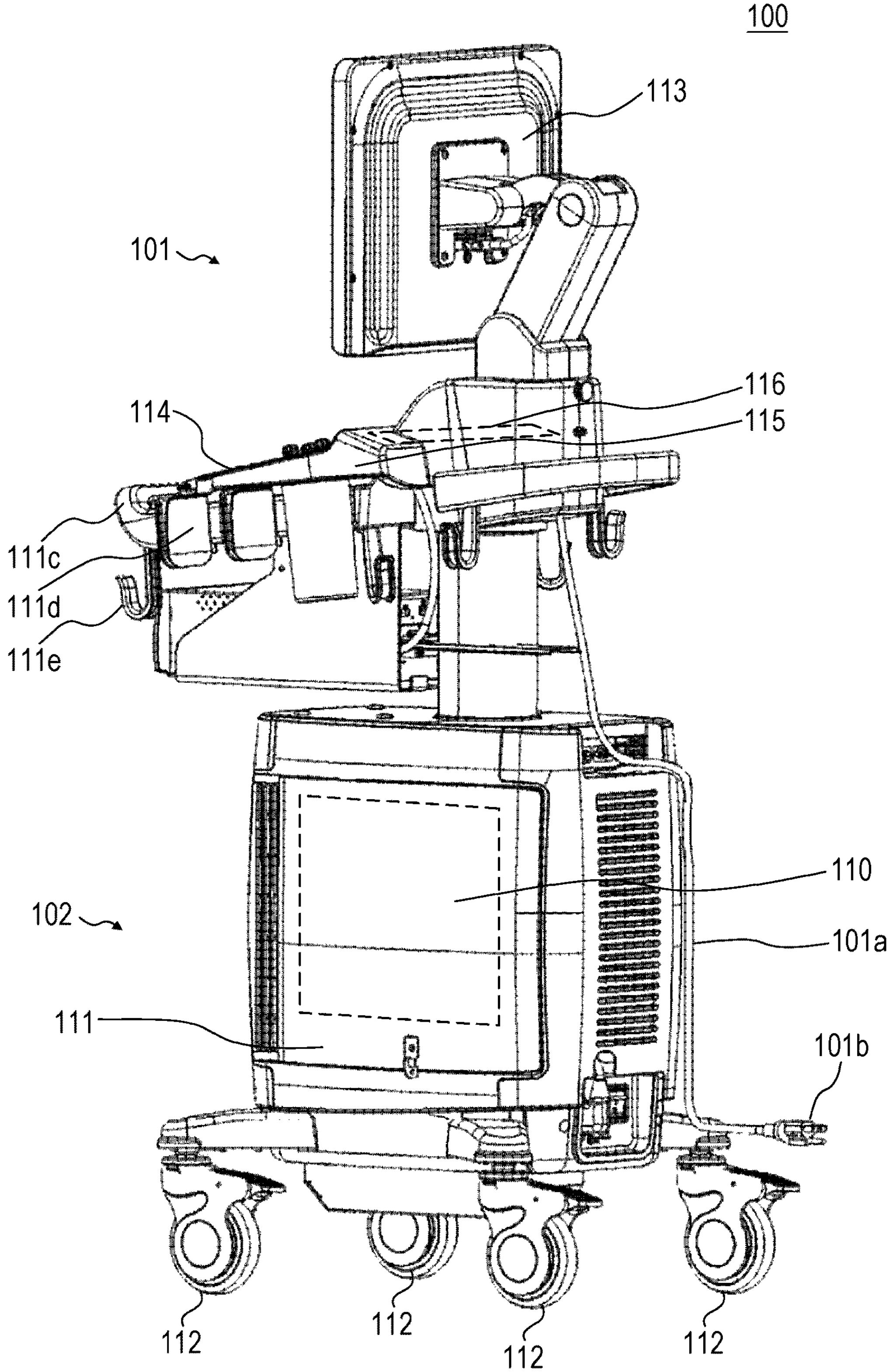
FIG. 2 is an external perspective view illustrating a back surface of the ultrasonic diagnostic system according to the embodiment.

FIGS. 1 and 2 are external perspective views illustrating a front surface and a back surface of an ultrasonic diagnostic system 100 according to an embodiment of the present invention.

The ultrasonic diagnostic system 100 includes an ultrasonic diagnostic apparatus 101 and a cart 102 on which the ultrasonic diagnostic apparatus 101 is placed and detachable. The ultrasonic diagnostic system 100 is an example of a portable ultrasonic diagnostic system having portability to be carried to a place where a user desires to perform ultrasonic diagnosis and used.

The cart 102 includes a housing 111 in which a second battery 110 is built in, and a caster portion 112 disposed on a lower surface portion of the housing 111. A detachable base 111*a* on which the ultrasonic diagnostic apparatus 101 is detachably mounted is provided in an upper portion of the housing 111. The second battery 110 is provided outside the ultrasonic diagnostic apparatus 101, but functions as a power source of the ultrasonic diagnostic apparatus 101. The second battery 110 may be configured to be replaceable with a spare battery.

The ultrasonic diagnostic apparatus 101 includes a display 113 connected to the detachable base 111*a* via an arm and disposed above the detachable base 111*a*, an operation panel 114 mounted on an upper portion of the detachable base 111*a*, an apparatus main body 115 having the operation panel 114 on a main surface, and a first battery 116 built in the apparatus main body 115. The apparatus main body 115 is clamped by a fixture 111*b* on the front side and fixed to the detachable base 111*a* in a state of being engaged with the root portion of the arm on the back side. The first battery 116 is provided inside the ultrasonic diagnostic apparatus 101 and functions as a power source of the ultrasonic diagnostic apparatus 101. The first battery 116 may be configured to be replaceable with a spare battery.

The housing 111 is a storage box that stores the second battery 110. The housing 111 has, for example, a substantially rectangular parallelepiped shape. The housing 111 is provided with a handle portion 111*c* serving as a handle when the ultrasonic diagnostic apparatus 101 is rotated or attached and detached. The housing 111 is provided with a probe holder 111*d* for placing an ultrasonic probe 1 (see FIG. 3). The housing 111 is provided with a plurality of hook portions 111*e* for hooking cables (not illustrated) for connecting the ultrasonic probe 1 to the apparatus main body 115.

The caster portion 112 is provided on the lower surface portion of the housing 111, and enables the ultrasonic diagnostic system 100 to move relative to the floor surface. In the lower surface portion of the housing 111, for example, a caster portion 112 is disposed at each of four corner portions. The caster portion 112 has, for example, a caster lock constituting a drum brake, is configured to be changeable between a locked state and an unlocked state by an operation of a user, is movable (conveyable) in the unlocked state, and is fixed in position in the locked state.

The display 113 displays an ultrasonic image, a setting screen, and various types of information. The operation panel 114 receives an input operation from a user. The apparatus main body 115 in which the display 113 and the operation panel 114 are integrated is supported by the detachable base 111*a* protruding upward from the housing 111. Since the detachable base 111*a* is pivotable about the axis in the vertical direction, the apparatus main body 115 in which the display 113 and the operation panel 114 are integrated is pivotable in the horizontal direction along with the pivot of the detachable base 111*a*. Note that the housing 111 is provided with a pivot mechanism (for example, the bearing mechanism) that supports the detachable base 111*a* so as to be pivotable about the axis with respect to the housing 111.

That is, the ultrasonic diagnostic apparatus 101 is pivotable about the axis with respect to the housing 111 by manual operation of the user. The user can freely change the direction of the ultrasonic diagnostic apparatus 101 according to the use environment. Note that the pivot mechanism includes a lock member (not illustrated) that locks the rotation of the detachable base 111*a*, and is normally held in a state where the rotation of the detachable base 111*a* is locked. In addition, when the lock member is unlocked by the operation of the user, the ultrasonic diagnostic apparatus 101 can pivot.

The apparatus main body 115 is detachable from the housing 111 (detachable base 111*a*) by manual operation of a user. That is, the user can detach the apparatus main body 115 from the cart 102 according to the use environment. Note that, in a case where the apparatus main body 115 is placed on the detachable base 111*a* and used, the apparatus main body 115 is held with the fixture 111*b* of the detachable base 111*a* locked. When the fixture 111*b* is unlocked by the operation of the user, the apparatus main body 115 can be separated from the cart 102.

In the ultrasonic probe 1, an element array configured to be two-dimensionally arranged in a longitudinal direction and a lateral direction at a distal end portion of the ultrasonic probe 1 is housed in a case.

The ultrasonic probe 1 includes a probe body in which an element array or the like is covered with a resin cover, a connection terminal connected to a probe connector provided in the ultrasonic diagnostic apparatus 101 (apparatus main body 115), and a cable extending between the probe body and the connection terminal and connecting the ultrasonic probe 1 to the apparatus main body 115.

The ultrasonic probe 1 is used in a state where a connection terminal is connected to a probe connector and a probe body is gripped by a user at the time of ultrasonic inspection.

Note that, as a type of the ultrasonic probe 1, there are various types of probes such as a convex probe and a linear probe, and in general, these probes are selectively used according to an inspection target and a purpose.

The ultrasonic diagnostic apparatus 101 further includes the first battery 116 which is a built-in battery of the apparatus main body 115, and a power supply plug 101*b* connected to an external power supply. The power supply plug 101*b* is provided at a terminal portion of a power cable 101*a* having an AC adapter unit 12 to be described later in the middle. The power cable 101_a_ has an end portion without the power supply plug 101_b_ connected to a power connector of an exposed portion of the lower surface portion of the ultrasonic diagnostic apparatus 101 attached to the cart 102, and an end portion that has become the power supply plug 101_b_ connected to an external power supply.

The cart 102 is an external battery detachable from the ultrasonic diagnostic apparatus 101, and includes a second battery 110 having a larger capacity than the first battery 116 of the ultrasonic diagnostic apparatus 101. In the present embodiment, the cart 102 does not have a power supply plug connected to an external power supply.

Each of the first battery 116 and the second battery 110 is replaceable with a reserve battery. The ultrasonic diagnostic apparatus 101 is driven by either supply power from an external power supply or discharge power from the first battery 116 and the second battery 110.

<Internal Configuration of Ultrasonic Diagnostic System 100>

Figure 3:
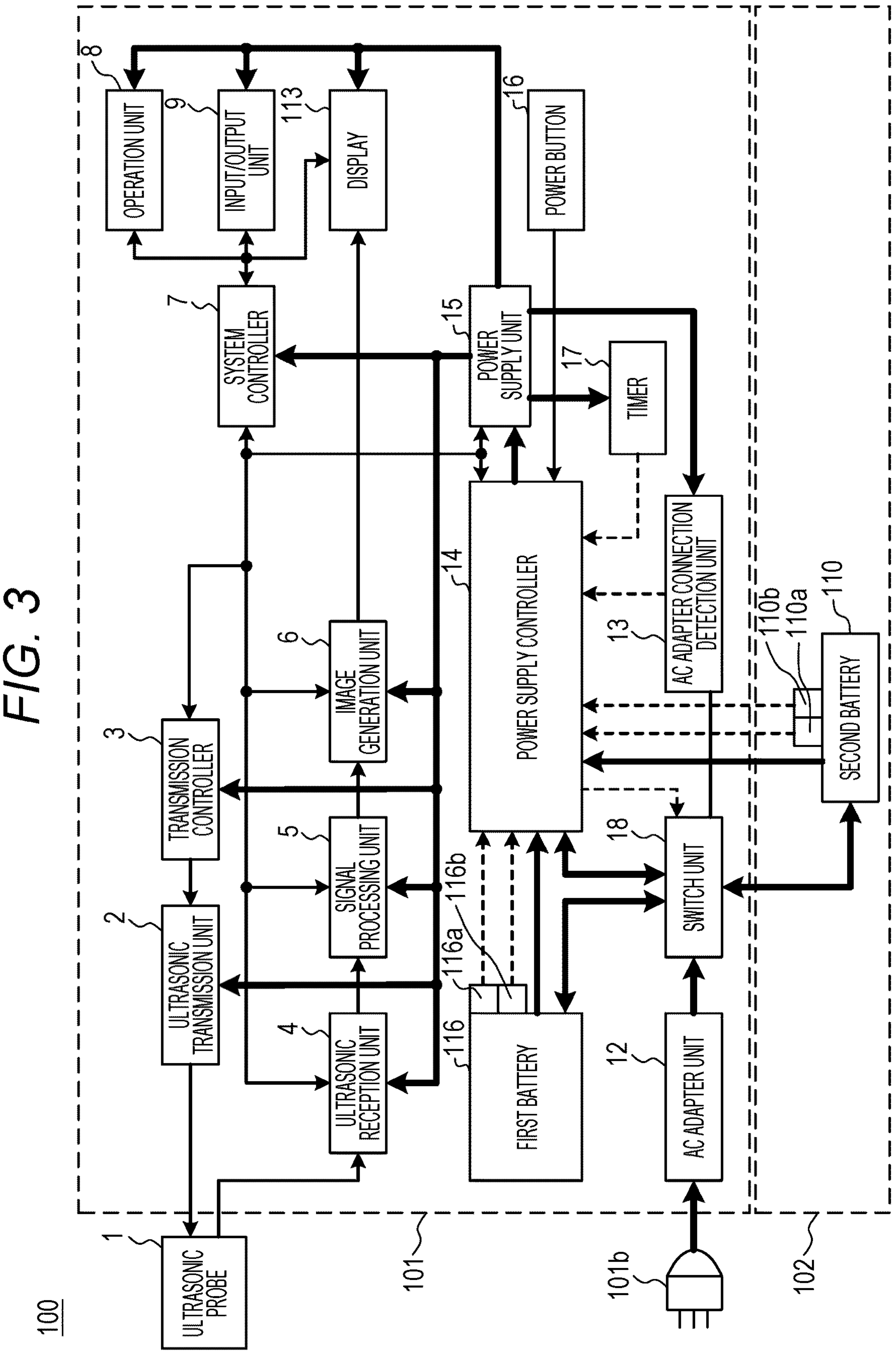
FIG. 3 is a block diagram schematically illustrating an internal configuration of the ultrasonic diagnostic system according to the embodiment.

FIG. 3 is a block diagram schematically illustrating an internal configuration of the ultrasonic diagnostic system 100 according to the present embodiment.

The ultrasonic diagnostic apparatus 101 includes an ultrasonic transmission unit 2, a transmission controller 3, an ultrasonic reception unit 4, a signal processing unit 5, an image generation unit 6, a system controller 7, an operation unit 8, an input/output unit 9, an alternate current (AC) adapter unit 12, an AC adapter connection detection unit 13, a power supply controller 14, a power supply unit 15, a power button 16, a timer 17, a switch unit 18, the display 113, and the first battery 116. The ultrasonic diagnostic apparatus 101 is configured to be connectable to the ultrasonic probe 1 and the power supply plug 101_b_. The cart 102 has the second battery 110.

The power supply controller 14 includes a calculation unit and a storage unit. The calculation unit is configured by, for example, a micro processor unit (MPU). The MPU is an example of a hardware processor included in the ultrasonic diagnostic system 100 in order to control the operation of each unit of the ultrasonic diagnostic system 100. The storage unit is a memory including a storage device such as a nonvolatile memory or a hard disk. The memory is an example of a non-transitory computer-readable recording medium that stores a program that causes the MPU to execute to implement the operation of each unit of the ultrasonic diagnostic system 100.

In addition, the power supply controller 14 further includes a wiring unit for transmitting power supplied from the first battery 116, the second battery 110, or the external power supply via the switch unit 18 to the power supply unit 15. In addition, the power supply controller 14 further includes a wiring unit for transmitting the discharge power of the first battery 116 to the second battery 110 via the switch unit 18 in a case where the second battery 110 is charged by the discharge power of the first battery 116, and a wiring unit for transmitting the discharge current of the second battery 110 to the first battery 116 via the switch unit 18 in a case where the first battery 116 is charged by the discharge power of the second battery 110.

The switch unit 18 switches the supply of the drive power to the ultrasonic diagnostic apparatus 101 and switches the charging of the first battery 116 or the second battery 110. The switch unit 18 constitutes a main part (an example of a controller) of the charge/discharge switching mechanism in the ultrasonic diagnostic system 100 together with the power supply controller 14. The charge/discharge switching mechanism will be described later.

The power supply unit 15 is an electric circuit including a DC-DC converter or the like that receives power transmission from the power supply controller 14, converts received power into power suitable for each component in the ultrasonic diagnostic apparatus 101 on the basis of the control of the power supply controller 14, and supplies power to each component. Each component in the ultrasonic diagnostic apparatus 101 includes, for example, an ultrasonic transmission unit 2, a transmission controller 3, an ultrasonic reception unit 4, a signal processing unit 5, an image generation unit 6, a system controller 7, an operation unit 8, an input/output unit 9, an AC adapter connection detection unit 13, a timer 17, and a display 113.

The ultrasonic diagnostic apparatus 101 receives power supply from any of the first battery 116, the second battery 110, and an external power supply (AC power supply) connected via the power supply plug 101_b_. When the ultrasonic diagnostic system 100 is activated by the user pressing the power button 16, the power supply controller 14 controls the switch unit 18 and the power supply unit 15 to supply power to each component in the ultrasonic diagnostic apparatus 101 via the power supply unit 15.

The AC adapter unit 12 is connected to the power supply plug 101_b_ and performs AC-DC conversion on an external power supply (AC power supply). The converted power (DC power) is supplied to the switch unit 18.

The first battery 116 and the second battery 110 are rechargeable power supplies for the ultrasonic diagnostic apparatus 101. The first battery 116 and the second battery 110 are charged by receiving power supply from an external power supply via the switch unit 18. When discharged, the charge power of the first battery 116 and the charge power of the second battery 110 are supplied to the power supply controller 14 directly or via the switch unit 18. The discharge power from the first battery 116 and the discharge power from the second battery 110 are transmitted from the power supply controller 14 to the power supply unit 15 in a case of being used to drive the ultrasonic diagnostic apparatus 101, and are transmitted from the power supply controller 14 to the second battery 110 and the first battery 116 via the switch unit 18 in a case of being used to charge the second battery 110 and the first battery 116.

The first battery 116 includes a remaining capacity acquisition unit 116_a_ that acquires information regarding the remaining capacity of the first battery 116 and a degradation degree acquisition unit 116_b_ that acquires information regarding the degradation degree of the first battery 116. In addition, the second battery 110 includes a remaining capacity acquisition unit 110_a_ that acquires information regarding the remaining capacity of the second battery 110 and a degradation degree acquisition unit 110_b_ that acquires information regarding the degradation degree of the second battery 110.

The remaining capacity acquisition units 110_a_ and 116_a_ include, for example, a voltage sensor that detects an inter-terminal voltage of a corresponding battery. The degradation degree acquisition units 110_b_ and 116_b_ include, for example, an MPU that measures a temporal change in the inter-terminal voltage value when the corresponding battery is fully charged. The acquisition information signals of the remaining capacity acquisition units 110_a_ and 116_a_ and the degradation degree acquisition units 110_b_ and 116_b_ are transmitted from the respective batteries to the power supply controller 14, and are used in switching control for switching charge control of the first battery 116 and the second battery

110 and switching control for switching discharge control of the first battery 116 and the second battery 110 in the power supply controller 14.

The AC adapter connection detection unit 13 monitors whether or not power is supplied from the AC power supply to the AC adapter unit 12, and transmits an identification signal (power supply connection presence/absence identification signal) indicating the presence or absence of the power supply connection to the power supply controller 14. The AC adapter connection detection unit 13 includes a voltage sensor or the like that detects an output voltage of the AC adapter unit 12. Specifically, the identification signal indicating the presence or absence of power supply connection is a signal that can determine whether or not the power supply is electrically connected to the AC power supply by outputting different signals when there is power supply from the AC power supply and when there is no power supply from the AC power supply.

The power supply connection presence/absence identification signal is used for switching control for switching charge control of the first battery 116 and the second battery 110 and switching control for switching discharge control of the first battery 116 and the second battery 110 in the power supply controller 14. In a case where there is power supply from the AC power supply, for example, in the discharge control, the power from the AC power supply may be transmitted to the power supply unit 15 without discharging the power from either the first battery 116 or the second battery 110, and in the charge control, either the first battery 116 or the second battery 110 may be charged. In addition, in a case where there is no power supply from the AC power supply, for example, in the discharge control, power may be discharged from either the first battery 116 or the second battery 110 and transmitted to the power supply unit 15, and in the charge control, charging of both the first battery 116 and the second battery 110 may be stopped.

The ultrasonic probe 1 includes a transducer, converts a transmission electric signal from the ultrasonic transmission unit 2 into an ultrasonic wave, and transmits the ultrasonic wave emitted from the transducer toward the subject in a state where the ultrasonic probe 1 is in contact with the surface of the subject. Then, the ultrasonic probe 1 receives the reflected ultrasonic wave from the subject, converts the reflected ultrasonic wave into a reception electric signal by the transducer, and supplies the reception electric signal to the ultrasonic reception unit 4.

The ultrasonic transmission unit 2 is a signal processing circuit that supplies a transmission electric signal for transmitting an ultrasonic wave to a transducer in the ultrasonic probe 1. The transmission controller 3 is a control circuit that controls a transmission electric signal for transmitting an ultrasonic wave from the ultrasonic probe 1 to the subject.

The ultrasonic reception unit 4 is a signal processing circuit that generates a reception signal by performing AC-DC conversion, gain adjustment, and the like on the reception electric signal received from the ultrasonic probe 1.

The signal processing unit 5 is a signal processing circuit that performs various digital signal processing such as log compression and edge enhancement on the reception signal generated by the ultrasonic reception unit 4 and outputs the processed signal to the image generation unit 6.

The image generation unit 6 performs various image conversions on the data output from the signal processing unit 5 to generate image data of an ultrasonic image, transmits the image data to the display 113, and displays the ultrasonic image on the display 113. The image generation unit 6 includes, for example, a hardware processor such as an MPU and a memory such as a nonvolatile memory or a hard disk.

The system controller 7 is connected to the ultrasonic transmission unit 2, the transmission controller 3, the ultrasonic reception unit 4, the signal processing unit 5, the image generation unit 6, the operation unit 8, the input/output unit 9, the power supply controller 14, the power supply unit 15, and the display 113, and performs system control among the units or units. The system controller 7 includes a memory such as a nonvolatile memory or a hard disk that stores a program for system control and data associated with the program, and a hardware processor such as an MPU that executes the program.

The operation unit 8 receives a user's input operation and outputs an operation signal to the system controller 7. The operation unit 8 is, for example, a button, a track ball, a rotary encoder, a touch panel, or the like. The input/output unit 9 is used for connection with an external device or the like. The input/output unit 9 inputs and outputs an image signal, such as storing image data generated by the image generation unit 6 in an external device and reading image data in the external device, under the control of the system controller 7.

The display 113 displays the image data generated by the image generation unit 6 as an image. The display 113 also displays various setting screens under the control of the system controller 7. Further, the display 113 can also display replacement times of the first battery 116 and the second battery 110 calculated by the system controller 7. In a case where the operation unit 8 includes a touch panel, the touch panel is provided on the display 113.

<Charge/Discharge Switching Mechanism of Ultrasonic Diagnostic System 100>

Figure 4:
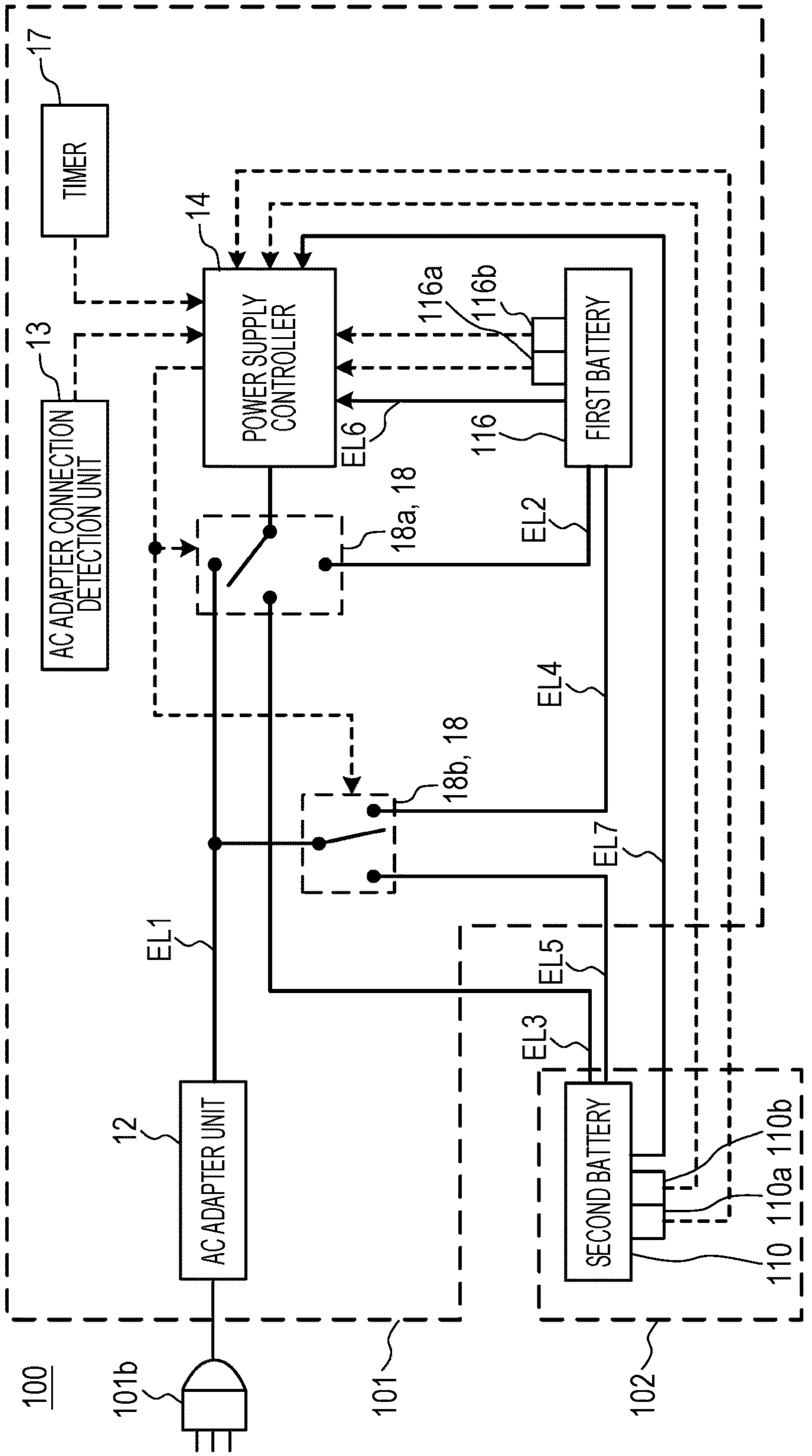
FIG. 4 is a block diagram illustrating a charge/discharge switching mechanism of the ultrasonic diagnostic system according to the embodiment.

FIG. 4 is a block diagram illustrating a charge/discharge switching mechanism of the ultrasonic diagnostic system 100 according to the present embodiment. The charge/discharge switching mechanism of the ultrasonic diagnostic system 100 includes the power supply controller 14 of the ultrasonic diagnostic apparatus 101, the first battery 116 of the ultrasonic diagnostic apparatus 101, the second battery 110 of the cart 102, the power supply plug 101*b* via the AC adapter unit 12 of the ultrasonic diagnostic apparatus 101, and the switch unit 18 of the ultrasonic diagnostic apparatus 101. The charge/discharge switching mechanism of the ultrasonic diagnostic system 100 further includes the remaining capacity acquisition unit 116*a* of the first battery 116, the degradation degree acquisition unit 116*b* of the first battery 116, the remaining capacity acquisition unit 110*a* of the second battery 110, the degradation degree acquisition unit 110*b* of the second battery 110, the AC adapter connection detection unit 13, and the timer 17.

The switch unit 18 includes a first switching element 18*a* and a second switching element 18*b*. The first switching element 18*a* and the second switching element 18*b* include a transistor, a metal oxide semiconductor field effect transistor (MOSFET), or the like. The switching signal to the first switching element 18*a* and the second switching element 18*b* is transmitted from the power supply controller 14.

The first switching element 18*a* is selectively switched to one of three paths; a path EL1 connecting the power supply plug 101*b* and the power supply controller 14; a path EL2 connecting the first battery 116 and the power supply controller 14; and a path EL3 connecting the second battery 110 and the power supply controller 14. Note that, in a case where the supply power from the external power supply is used only for either the charging of the first battery 116 or the charging of the second battery 110, the first switching element 18*a* may not have a contact point that switches to the path EL1.

The second switching element 18*b* is connected to a connection path connecting the power supply plug 101*b* and the second switching element 18*b* in the middle of a path EL1 connecting the power supply plug 101*b* and the first switching element 18*a*. The second switching element 18*b* is selectively switched to one of two paths; a path EL4 connecting the power supply plug 101*b* and the first battery 116; and a path EL5 connecting the power supply plug 101*b* and the second battery 110. In a case where the charging of the first and second batteries 116 and 110 is performed, the second switching element 18*b* is switched so that the supply power from the external power supply is either the charging power of the first battery 116 or the charging power of the second battery 110. Note that, in a case where the first and second batteries 116 and 110 are not charged, the second switching element 18*b* may be in an OFF state in which the supply power from the external power supply is neither the charging power of the first battery 116 nor the charging power of the second battery 110.

Note that switching of various paths in the switch unit 18 is automatically performed according to the states of the first and second batteries 116 and 110 and the like as described later, but may be manually performed as appropriate. In a case where the path switching is automatically performed, the switching of the charge control and the switching of the discharge control become efficient, which is preferable.

In addition, the ultrasonic diagnostic apparatus 101 is separately provided with a path EL6 in one direction through which discharge power is sent from the first battery 116 to the power supply controller 14, and a path EL7 in one direction through which discharge power is sent from the second battery 110 to the power supply controller 14.

The power supply controller 14 performs both switching control (charge switching control) for switching charge control of the first and second batteries 116 and 110 and switching control (discharge switching control) for switching discharge control of the first and second batteries 116 and 110.

The power supply controller 14 performs, for example, the following switching control on the basis of the information regarding the remaining capacity of the first battery 116 and the information regarding the remaining capacity of the second battery 110 acquired by the remaining capacity acquisition units 110*a* and 116*a*.

For example, when the remaining capacity of the second battery 110 is less than the remaining capacity of the first battery 116, the power supply controller 14 performs switching of charge control and switching of discharge control such that the second battery 110 is charged using the supply power from the external power supply and the discharge power from the first battery 116.

At the time of the charge switching control of the second battery 110, the first switching element 18*a* is switched to a path EL3 connecting the second battery 110 and the power supply controller 14 under the control of the power supply controller 14. The discharge power of the first battery 116 is transmitted via a path EL6 and used as the drive power of the ultrasonic diagnostic apparatus 101, and is used as the charge power of the second battery 110 via the paths EL6 and EL3 sequentially. The second switching element 18*b* is switched to a path EL5 connecting the power supply plug 101*b* and the second battery 110, and the supply power from the external power supply is used for the charge power of the second battery 110 via the path EL5.

As described above, the power supply controller 14 can perform the switching control so that the discharge power from one of the first and second batteries 116 and 110 is used for charging the other one of the first and second batteries 116 and 110 together with the supply power from the external power supply with reference to the remaining capacity of at least one of the first or second batteries 116 and 110. Here, any one of the above-described batteries may be a battery having a small remaining capacity or a battery having a large remaining capacity. Whether one of the batteries described above is a battery with a small remaining capacity or a battery with a large amount of overtime work is only required to be determined on the basis of the degradation degree of the first and second batteries 116 and 110 and/or the unused time (the duration of the unused state) of the first and second batteries 116 and 110. In addition, whether the remaining capacity is large or small may be determined by comparing the remaining capacities of both the first and second batteries 116 and 110 with each other, or may be determined by comparing the remaining capacity of at least one of the first or second batteries 116 and 110 with a predetermined specified value.

The power supply controller 14 performs, for example, the following switching control on the basis of the information regarding the degradation degree of the first battery 116 and the information regarding the degradation degree of the second battery 110 acquired by the degradation degree acquisition units 110*b* and 116*b*.

For example, when the degradation degree of the first battery 116 is higher than the degradation degree of the second battery 110, the power supply controller 14 performs switching of charge control and switching of discharge control so as to charge the second battery 110 by using the supply power from the external power supply and the discharge power from the first battery 116.

At the time of the charge switching control of the second battery 110, the first switching element 18*a* is switched to the path EL3 connecting the second battery 110 and the power supply controller 14 under the control of the power supply controller 14. The discharge power of the first battery 116 is transmitted via the path EL6 and used as the drive power of the ultrasonic diagnostic apparatus 101, and is used as the charge power of the second battery 110 via the paths EL6 and EL3 sequentially. The second switching element 18*b* is switched to the path EL5 connecting the power supply plug 101*b* and the second battery 110, and the supply power from the external power supply is used for the charge power of the second battery 110 via the path EL5.

As described above, the power supply controller 14 can perform the switching control so that the discharge power from one of the first and second batteries 116 and 110 is used for charging the other one of the first and second batteries 116 and 110 together with the supply power from the external power supply with reference to the degradation degree of at least one of the first or second batteries 116 and 110. Here, any one of the batteries described above may be a battery having a low degradation degree or a battery having a high degradation degree. Whether one of the batteries described above is a battery having a low degradation degree or a battery having a high degradation degree is only required to be determined on the basis of the remaining capacity of the first and second batteries 116 and 110 and/or the unused time of the first and second batteries 116 and 110. In addition, whether the degradation degree is low or high may be determined by comparing the degradation degrees of both the first and second batteries 116 and 110 with each other, or may be determined by comparing the degradation degree of at least one of the first or second batteries 116 and 110 with a predetermined specified value.

The power supply controller 14 performs, for example, the following switching control on the basis of the information indicated by the power supply connection presence/absence identification signal from the AC adapter connection detection unit 13.

For example, when power is supplied from an external AC power supply, the power supply controller 14 switches charge control and switches discharge control so as to charge the other of the first and second batteries 116 and 110 using the supply power from the external power supply and the discharge power from one of the first and second batteries 116 and 110 on the basis of the remaining capacity, the degradation degree, and the unused time of the first and second batteries 116 and 110. In addition, when there is no power supply from the external AC power supply, the power supply controller 14 switches the charge control and the discharge control so as not to charge any of the first and second batteries 116 and 110 and to use the discharge power from any one of the first and second batteries 116 and 110 as it is for the driving power supply of the ultrasonic diagnostic system 100.

<Flow of Charge/Discharge Switching Control Process of Ultrasonic Diagnostic System 100>

Figure 5:
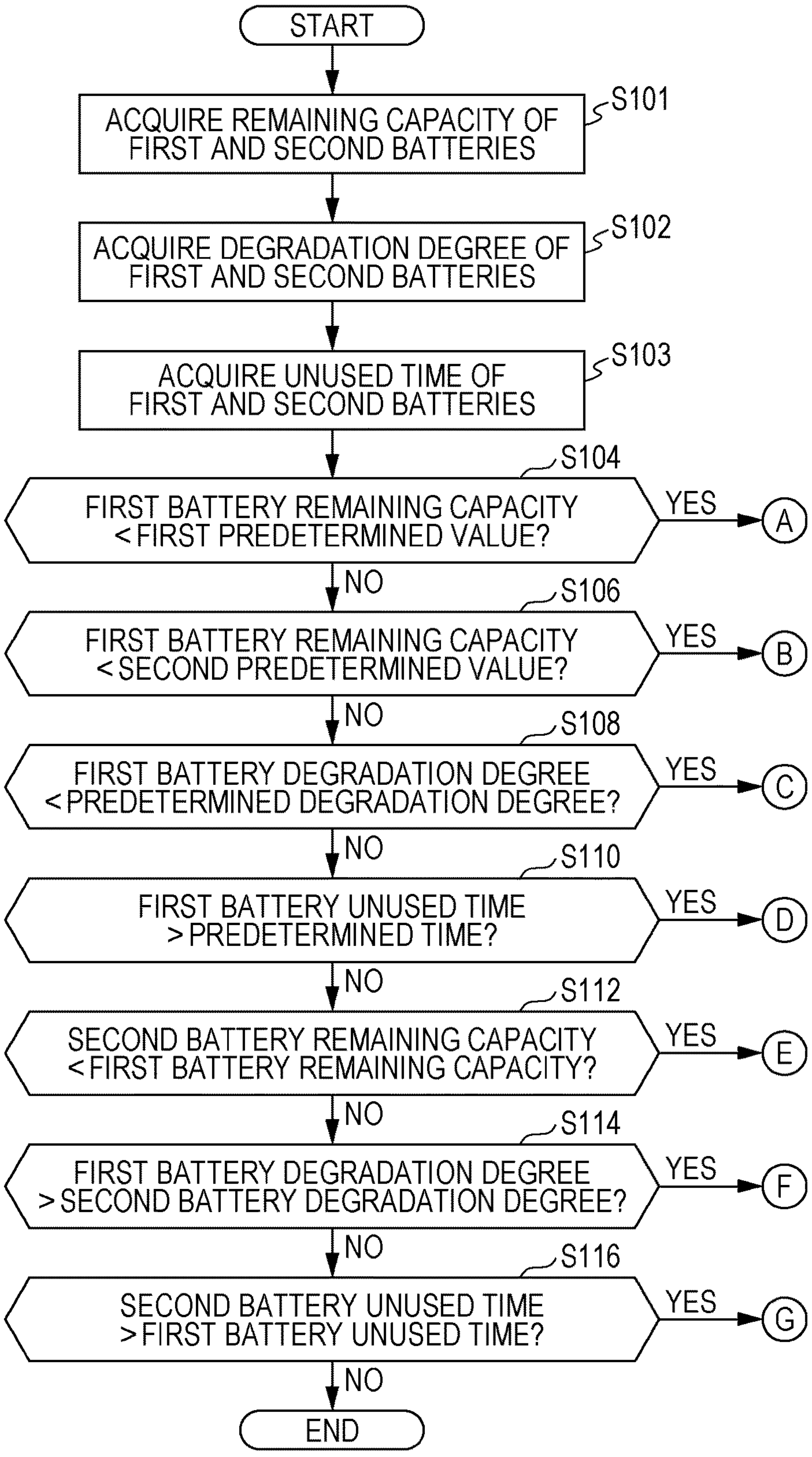
FIG. 5 is a flowchart illustrating a main flow of charge/discharge switching control of the ultrasonic diagnostic system according to the embodiment.
Figure 6:
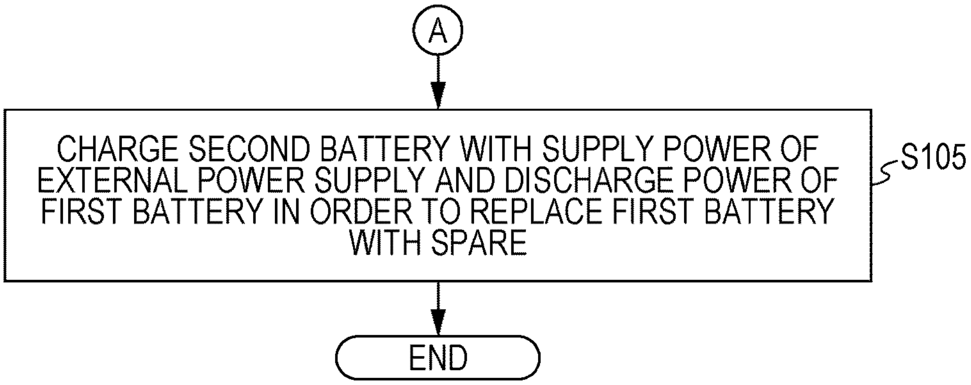
FIG. 6 is a flowchart illustrating steps in a case where a first battery remaining capacity is less than a first predetermined value in charge/discharge switching control of the ultrasonic diagnostic system according to the embodiment.
Figure 7:
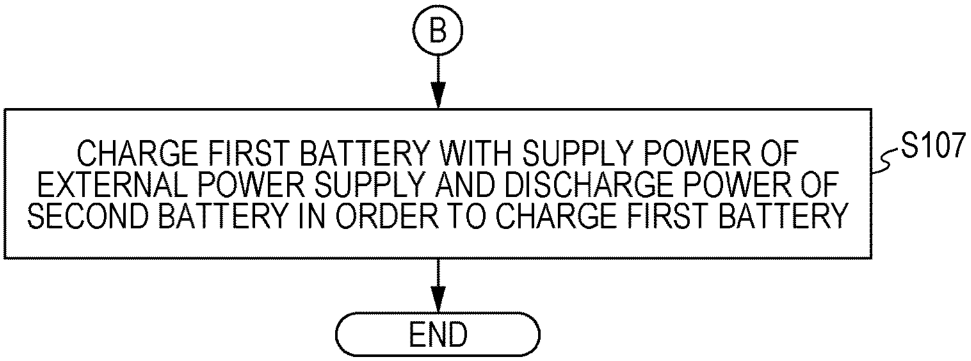
FIG. 7 is a flowchart illustrating steps in a case where a first battery remaining capacity is less than a second predetermined value in charge/discharge switching control of the ultrasonic diagnostic system according to the embodiment.
Figure 8:
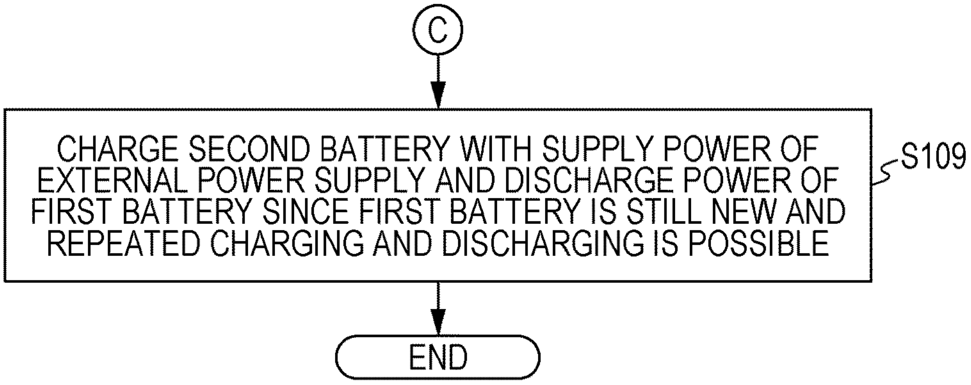
FIG. 8 is a flowchart illustrating steps in a case where a first battery degradation degree is less than a predetermined degradation degree in charge/discharge switching control of the ultrasonic diagnostic system according to the embodiment.
Figure 9:
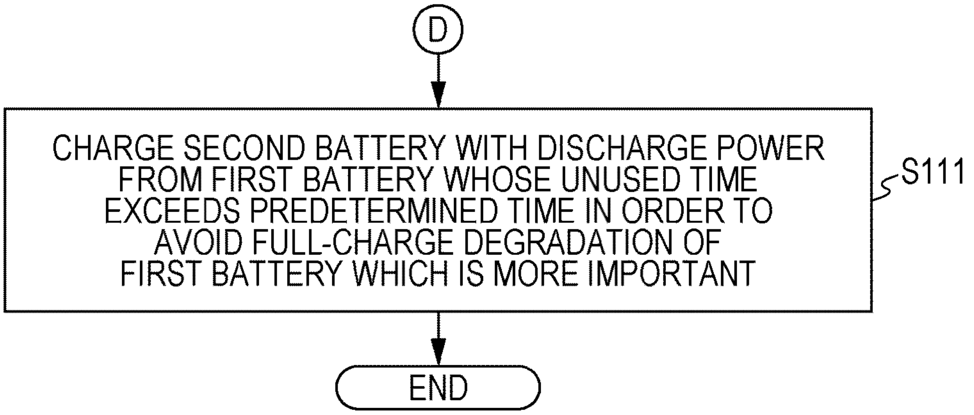
FIG. 9 is a flowchart illustrating steps in a case where a first battery unused time exceeds a predetermined time in charge/discharge switching control of the ultrasonic diagnostic system according to the embodiment.
Figure 10:
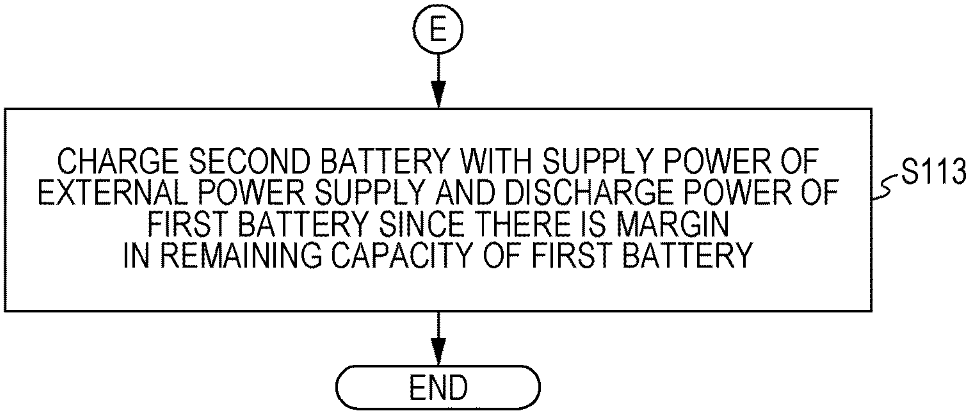
FIG. 10 is a flowchart illustrating steps in a case where a second battery remaining capacity is less than a first battery remaining capacity in charge/discharge switching control of the ultrasonic diagnostic system according to the embodiment.
Figure 11:
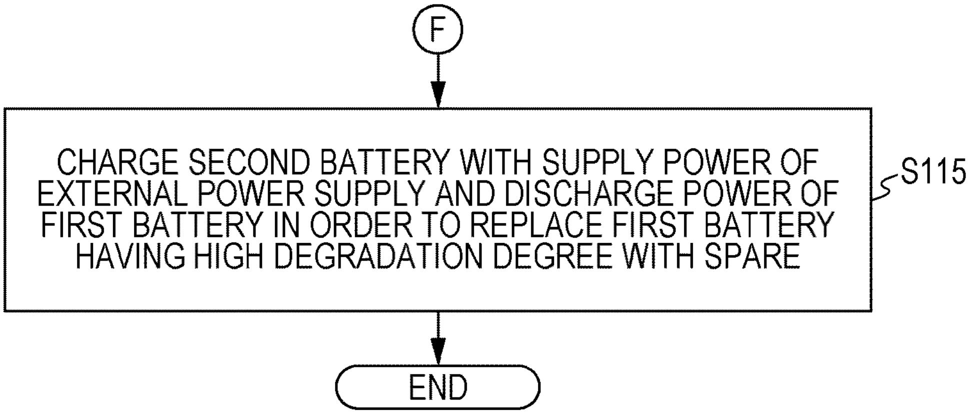
FIG. 11 is a flowchart illustrating steps in a case where the first battery remaining capacity exceeds the second battery remaining capacity in charge/discharge switching control of the ultrasonic diagnostic system according to the embodiment.
Figure 12:
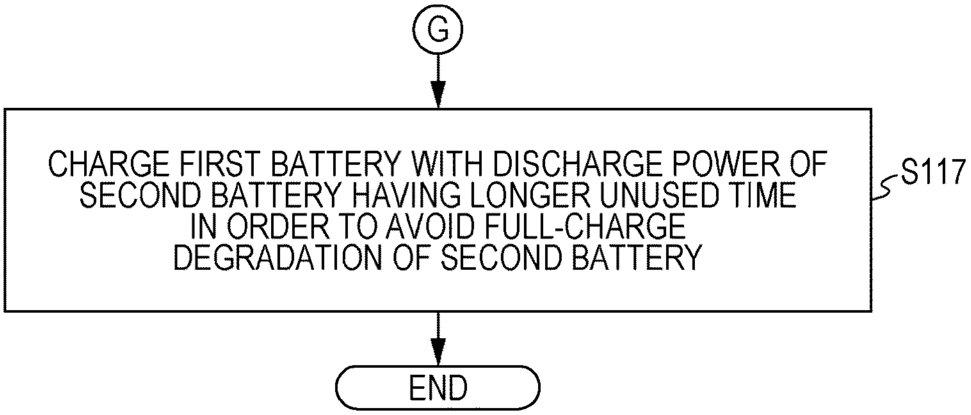
FIG. 12 is a flowchart illustrating steps in a case where the second battery unused time exceeds the first battery unused time in charge/discharge switching control of the ultrasonic diagnostic system according to the embodiment.

FIG. 5 is a flowchart illustrating a main flow of charge/discharge switching control of the ultrasonic diagnostic system 100 according to the present embodiment. FIGS. 6 to 12 are flowcharts illustrating steps performed in specific cases in the charge/discharge switching control.

The charge/discharge switching control of the ultrasonic diagnostic system 100 is repeatedly executed according to a predetermined program stored in advance in an MPU or a memory in the power supply controller 14. The first predetermined value, the second predetermined value, the predetermined degradation degree, and the unused time used in the charge/discharge switching control are stored in advance in the power supply controller 14. In the charge/discharge switching control, one of the supply power from the external power supply and the discharge power from the first battery 116 or the discharge power from the second battery 110 performs the other of the charge of the first battery 116 or the charge of the second battery 110 while appropriately switching on the basis of various types of information. Note that the charge/discharge switching control described below is based on the premise that power supply from the external AC power supply is confirmed by the power supply connection presence/absence identification signal notified from the AC adapter connection detection unit 13 to the power supply controller 14.

When the charge/discharge switching control of the ultrasonic diagnostic system 100 is started, the power supply controller 14 first acquires information regarding the remaining capacity of the first battery 116 and information regarding the remaining capacity of the second battery 110 by the remaining capacity acquisition units 110*a* and 116*a* in S101. The power supply controller 14 then shifts the process to S102.

In S102, the power supply controller 14 acquires the information regarding the degradation degree of the first battery 116 and the information regarding the degradation degree of the second battery 110 by the degradation degree acquisition units 110*b* and 116*b*. The power supply controller 14 then shifts the process to S103.

In S103, the power supply controller 14 acquires the unused time of the first battery 116 and the unused time of the second battery 110 using the timer 17. The power supply controller 14 then shifts the process to S104.

In S104, the power supply controller 14 determines whether or not the remaining capacity of the first battery 116 is less than a first predetermined value on the basis of the information regarding the remaining capacity of the first battery 116. The first predetermined value is a remaining capacity value at which the remaining capacity of the first battery 116 is significantly small, and it is determined that it is preferable to discharge the first battery 116 to make it empty rather than to charge the first battery 116 to full charge and replace it with a spare new first battery 116 from the viewpoint of early securing of the built-in battery capacity. When YES in S104, the power supply controller 14 shifts the process to S105. When NO in S104, the power supply controller 14 shifts the process to S106.

In order to replace the first battery 116 with a spare new first battery 116 in S105, the power supply controller 14 charges the second battery 110 with the supply power of the external power supply and the discharge power of the first battery 116. At this time, the first switching element 18*a* is switched to the path EL3 and the second switching element 18*b* is switched to the path EL5 by the switching signal transmitted from the power supply controller 14. The current of the supply power of the external power supply is directed to the second battery 110 via the path EL5. The current of the discharge power of the first battery 116 flows toward the second battery 110 via the paths EL6 and EL3. The power supply controller 14 then ends the process.

In S106, the power supply controller 14 determines whether or not the remaining capacity of the first battery 116 is less than the second predetermined value on the basis of the information regarding the remaining capacity of the first battery 116. The second predetermined value is larger than the first predetermined value. The second predetermined value is a remaining capacity value not a situation in which the remaining capacity of the first battery 116 is not sufficient but significantly small, and determined to be preferable from the viewpoint of certainty of early securing of the built-in battery capacity to charge the first battery 116 to full charge rather than to discharge the first battery 116 to empty capacity. When YES in S106, the power supply controller 14 shifts the process to S107. When NO in S106, the power supply controller 14 shifts the process to S108.

In S107, the power supply controller 14 charges the first battery 116 with supply power from the external power supply and discharge power from the second battery 110 in order to charge the first battery 116. At this time, the first switching element 18*a* is switched to the path EL2 and the second switching element 18*b* is switched to the path EL4 by the switching signal transmitted from the power supply controller 14. The current of the supply power of the external power supply is directed to the first battery 116 via the path EL4. The current of the discharge power of the second battery 110 flows toward the first battery 116 via the paths EL7 and EL2. The power supply controller 14 then ends the process.

In S108, the power supply controller 14 determines whether or not the degradation degree of the first battery 116 is lower than a predetermined degradation degree on the basis of the information regarding the remaining capacity of the first battery 116. The predetermined degradation degree is a degradation degree value at which it is determined that the first battery 116 is new and has resistance to repeated charging and discharging. When YES in S108, the power supply controller 14 shifts the process to S109. When NO in S108, the power supply controller 14 shifts the process to S110.

In S109, since the first battery 116 is still new and there is no problem even if charging and discharging are repeated, the power supply controller 14 charges the second battery 110 with the supply power of the external power supply and the discharge power of the first battery 116. At this time, the first switching element 18*a* is switched to the path EL3 and the second switching element 18*b* is switched to the path EL5 by the switching signal transmitted from the power supply controller 14. The current of the supply power of the external power supply is directed to the second battery 110 via the path EL5. The current of the discharge power of the first battery 116 flows toward the second battery 110 via the paths EL6 and EL3. The power supply controller 14 then ends the process.

In S110, the power supply controller 14 determines whether or not the unused time of the first battery 116 exceeds a predetermined time on the basis of the unused time of the first battery 116. The predetermined time is a time value at which it is determined that it is preferable to protect the first battery 116 from full-charge degradation, which is relatively important in terms of being mounted on the ultrasonic diagnostic apparatus 101. When YES in S110, the power supply controller 14 shifts the process to S111. When NO in S110, the power supply controller 14 shifts the process to S112.

In S111, in order to prevent full-charge degradation of the first battery 116 by avoiding leaving of the first battery 116 that is fully charged or nearly fully charged, the power supply controller 14 charges the second battery 110 with supply power from the external power supply and discharge power from the first battery 116 whose unused time exceeds a predetermined time. At this time, the first switching element 18*a* is switched to the path EL3 and the second switching element 18*b* is switched to the path E15 by the switching signal transmitted from the power supply controller 14. The current of the supply power of the external power supply is directed to the second battery 110 via the path EL5. The current of the discharge power of the first battery 116 flows toward the second battery 110 via the paths EL6 and EL3. The power supply controller 14 then ends the process.

In S112, the power supply controller 14 determines whether or not the remaining capacity of the second battery 110 is less than the remaining capacity of the first battery 116 on the basis of the information regarding the remaining capacity of the first battery 116 and the information regarding the remaining capacity of the second battery 110. When YES in S112, the power supply controller 14 shifts the process to S113. When NO in S112, the power supply controller 14 shifts the process to S114.

In S113, since there is a margin in the remaining capacity of the first battery 116, the power supply controller 14 charges the second battery 110 with the supply power of the external power supply and the discharge power of the first battery 116. At this time, the first switching element 18*a* is switched to the path EL3 and the second switching element 18*b* is switched to the path EL5 by the switching signal transmitted from the power supply controller 14. The current of the supply power of the external power supply is directed to the second battery 110 via the path EL5. The current of the discharge power of the first battery 116 flows toward the second battery 110 via the paths EL6 and EL3. The power supply controller 14 then ends the process.

In S114, the power supply controller 14 determines whether or not the degradation degree of the first battery 116 is higher than the degradation degree of the second battery 110 on the basis of the information regarding the degradation degree of the first battery 116 and the information regarding the degradation degree of the second battery 110. When YES in S114, the power supply controller 14 shifts the process to S115. When NO in S114, the power supply controller 14 shifts the process to S116.

In S115, in order to replace the first battery 116 having a high degradation degree with a spare new (low degradation degree) first battery 116, the power supply controller 14 charges the second battery 110 with the supply power of the external power supply and the discharge power of the first battery 116. At this time, the first switching element 18*a* is switched to the path EL3 and the second switching element 18*b* is switched to the path EL5 by the switching signal transmitted from the power supply controller 14. The current of the supply power of the external power supply is directed to the second battery 110 via the path EL5. The current of the discharge power of the first battery 116 flows toward the second battery 110 via the paths EL6 and EL3. The power supply controller 14 then ends the process.

In S116, the power supply controller 14 determines whether or not the unused time of the second battery 110 exceeds the unused time of the first battery 116 on the basis of the unused time of the first battery 116 and the unused time of the second battery 110. When YES in S116, the power supply controller 14 shifts the process to S117. When NO in S116, the power supply controller 14 ends the process.

In S117, the power supply controller 14 charges the first battery 116 with the supply power of the external power supply and the discharge power of the second battery 110 in order to avoid the full-charge degradation of the second battery 110 having a margin in remaining capacity, a low degradation degree, and being left for a long time. At this time, the first switching element 18*a* is switched to the path EL2 and the second switching element 18*b* is switched to the path EL4 by the switching signal transmitted from the power supply controller 14. The current of the supply power of the external power supply is directed to the first battery 116 via the path EL4. The current of the discharge power of the second battery 110 flows toward the first battery 116 via the paths EL7 and EL2. The power supply controller 14 then ends the process.

Note that the power supply controller 14 may perform control such that a larger remaining capacity is always left than that of the second battery 110 of the cart 102 without considering replacement of the first battery 116 of the ultrasonic diagnostic apparatus 101 with a spare new first battery 116.

In addition, the power supply controller 14 may perform control to discharge one of the first battery 116 and the second battery 110 that is unused for a long time.

<Summary of Functions and Effects of Ultrasonic Diagnostic System 100>

As described above, according to the present embodiment, the ultrasonic diagnostic system 100 employs a configuration including a plurality of batteries including the first and second batteries 116 and 110 that function as a power source of the ultrasonic diagnostic apparatus 101, and a controller including the power supply controller 14 and the switch unit 18 that switch and execute individual charging of the plurality of batteries. More specifically, the controller is configured to switch between individual charging of the first battery 116 and individual charging of the second battery 110.

In general, in a case where a plurality of batteries is prepared as a power source of an ultrasonic diagnostic apparatus in an ultrasonic diagnostic system, it is necessary to suitably switch charge control for the plurality of batteries. If the plurality of batteries is to be charged at the same time, large current power supply to the plurality of batteries is required, and a larger AC/DC power supply component is required, which may cause an undesirable influence on the portability of the ultrasonic diagnostic system. In addition, this becomes more remarkable as the number of batteries increases.

In this regard, in the above configuration of the present embodiment, since the individual charging of the plurality of batteries, more specifically, the individual charging of the first battery 116 and the individual charging of the second battery 110 are switched, it is possible to improve the efficiency of the charge control for the plurality of batteries functioning as the power source of the ultrasonic diagnostic apparatus 101.

Further, according to the present embodiment, the first battery 116 is built in the ultrasonic diagnostic apparatus 101, and the second battery 110 is provided outside the ultrasonic diagnostic apparatus 101. More specifically, the second battery 110 is built in the cart 102 to which the ultrasonic diagnostic apparatus 101 is detachable. That is, in the present embodiment, even when a plurality of batteries functioning as a power source of the ultrasonic diagnostic apparatus 101 includes an external battery, it is possible to improve the efficiency of charge control for the plurality of batteries.

Furthermore, according to the present embodiment, the power supply controller 14 and the switch unit 18 prioritize the individual charging of the first battery 116, which is a built-in battery of the ultrasonic diagnostic apparatus 101, rather than the individual charging of the second battery 110, which is an external battery of the ultrasonic diagnostic apparatus 101. Here, prioritizing means executing processes (S104 to S107) for securing the remaining capacity of the first battery 116 at an early stage in the repeatedly executed charge/discharge switching control.

In a case where the external battery (second battery 110) is preferentially charged rather than the built-in battery (first battery 116), there is a possibility that the remaining capacity of the built-in battery does not increase without charging the built-in battery at all until the external battery is fully charged. Under such circumstances, in a case where the external battery is suddenly removed from the ultrasonic diagnostic apparatus 101 for diagnosis in a narrow place and the ultrasonic diagnostic apparatus 101 is carried and used, there is a possibility that power supply to the ultrasonic diagnostic apparatus 101 is likely to be interrupted.

In this regard, in the above configuration of the present embodiment, since the individual charging of the first battery 116, which is a built-in battery, is prioritized, it is possible to suppress the occurrence of interruption of the power supply to the ultrasonic diagnostic apparatus 101 even in a case where the ultrasonic diagnostic apparatus 101 is used with the external battery removed from the ultrasonic diagnostic apparatus 101.

Further, according to the present embodiment, the power supply controller 14 and the switch unit 18 adopt a configuration to control discharge from the first and second batteries 116 and 110 when individual charging of a plurality of batteries, more specifically, individual charging of the first battery 116 and individual charging of the second battery 110 are switched and executed. More specifically, the current of the discharge power from the battery to be discharged is directed to the battery to be charged and used for charging the battery to be charged. According to this configuration, it is possible to further improve the efficiency of charge control for the plurality of batteries.

Furthermore, according to the present embodiment, the power supply controller 14 and the switch unit 18 adopt a configuration in which a battery to be charged is switched on the basis of the remaining capacity, the degradation degree, or the unused time of each of the plurality of batteries, more specifically, the first and second batteries 116 and 110, and a battery to be discharged that charges the battery to be charged in cooperation with an external power supply is switched.

For example, in a case where the remaining capacity of the first battery 116 is significantly small, the charging target is the second battery 110 and the discharging target is the first battery 116. In addition, in a case where the remaining capacity of the first battery 116 is small to some extent, the charging target is the first battery 116 and the discharging target is the second battery 110. In addition, in a case where the remaining capacity of the first battery 116 is larger than the remaining capacity of the second battery 110, the charging target is the second battery 110 and the discharging target is the first battery 116. By switching the charge control and the discharge control based on the remaining capacity of each of the first and second batteries 116 and 110 as described above, the individual charge efficiency of the first and second batteries 116 and 110 can be maximized.

In addition, for example, in a case where the degradation degree of the first battery 116 is small, the charging target is the second battery 110 and the discharging target is the first battery 116. In addition, in a case where the degradation degree of the first battery 116 is larger than the degradation degree of the second battery 110, the charging target is the second battery 110 and the discharging target is the first battery 116. In addition, even if the degradation degree of the first battery 116 is large, the charging target may be the first battery 116 and the discharging target may be the second battery 110 depending on the situation. By switching the charge control and the discharge control based on the degradation degree of each of the first and second batteries 116 and 110 as described above, the individual charge efficiency of the first and second batteries 116 and 110 can be maximized.

In addition, for example, in a case where the unused time of the first battery 116 is long, the charging target is the second battery 110 and the discharging target is the first battery 116. In addition, in a case where the unused time of the second battery 110 is longer than the unused time of the first battery 116, the charging target is the first battery 116 and the discharging target is the second battery 110. By switching the charge control and the discharge control based on the unused time of each of the first and second batteries 116 and 110 as described above, the individual charge efficiency of the first and second batteries 116 and 110 can be maximized.

Hereinafter, some modifications to the present embodiment will be described. In the description of the modification, differences from the above embodiment will be mainly described, and the description of the same matters as those of the above embodiment will be omitted.

<Modification 1>

Figure 13:
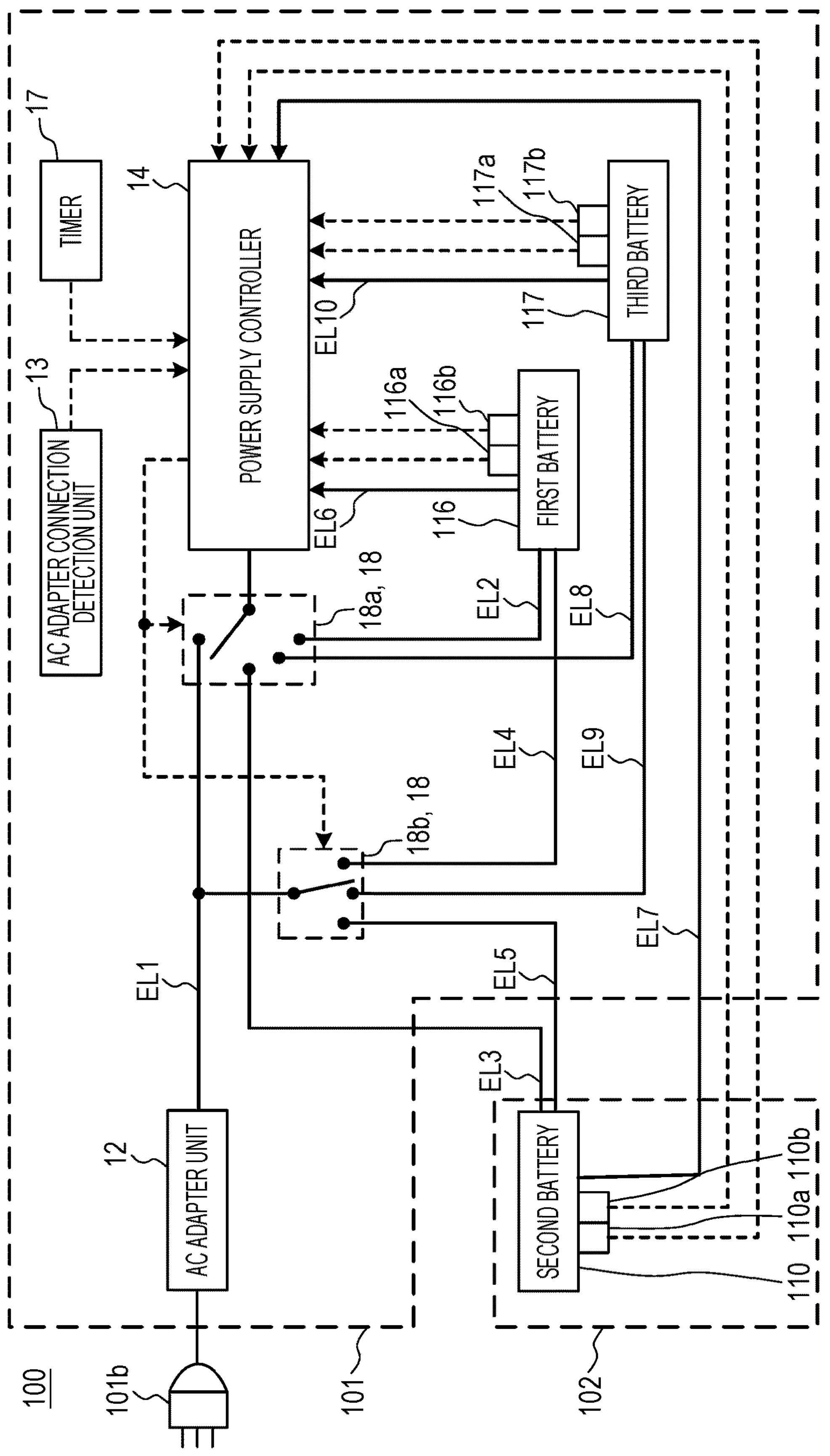
FIG. 13 is a block diagram illustrating a charge/discharge switching mechanism of an ultrasonic diagnostic system according to Modification 1 of the embodiment.

FIG. 13 is a block diagram illustrating a charge/discharge switching mechanism of an ultrasonic diagnostic system 100 according to Modification 1 of the present embodiment.

The ultrasonic diagnostic apparatus 101 includes a first battery 116 and a third battery 117. The third battery 117 includes a remaining capacity acquisition unit 117*a* of the third battery 117 and a degradation degree acquisition unit 117*b* of the third battery 117. The third battery 117 is a built-in battery of the ultrasonic diagnostic apparatus 101 similar to the first battery 116. The remaining capacity acquisition unit 117*a* and the degradation degree acquisition unit 117*b* have the same configuration and the same function as the remaining capacity acquisition unit 116*a* and the degradation degree acquisition unit 116*b* of the first battery 116, respectively. Regarding the configuration, specifically, the third battery 117 is connected to the switching element 18*a* of the switch unit 18 by a path EL8, is connected to the switching element 18*b* of the switch unit 18 by a path EL9, and is connected to the power supply controller 14 by a unidirectional path EL10 through which discharge power is sent from the third battery 117 to the power supply controller 14.

Even when the number of built-in batteries is plural as in Modification 1, the functions and effects described in the above embodiment can be realized.

<Modification 2>

Figure 14:
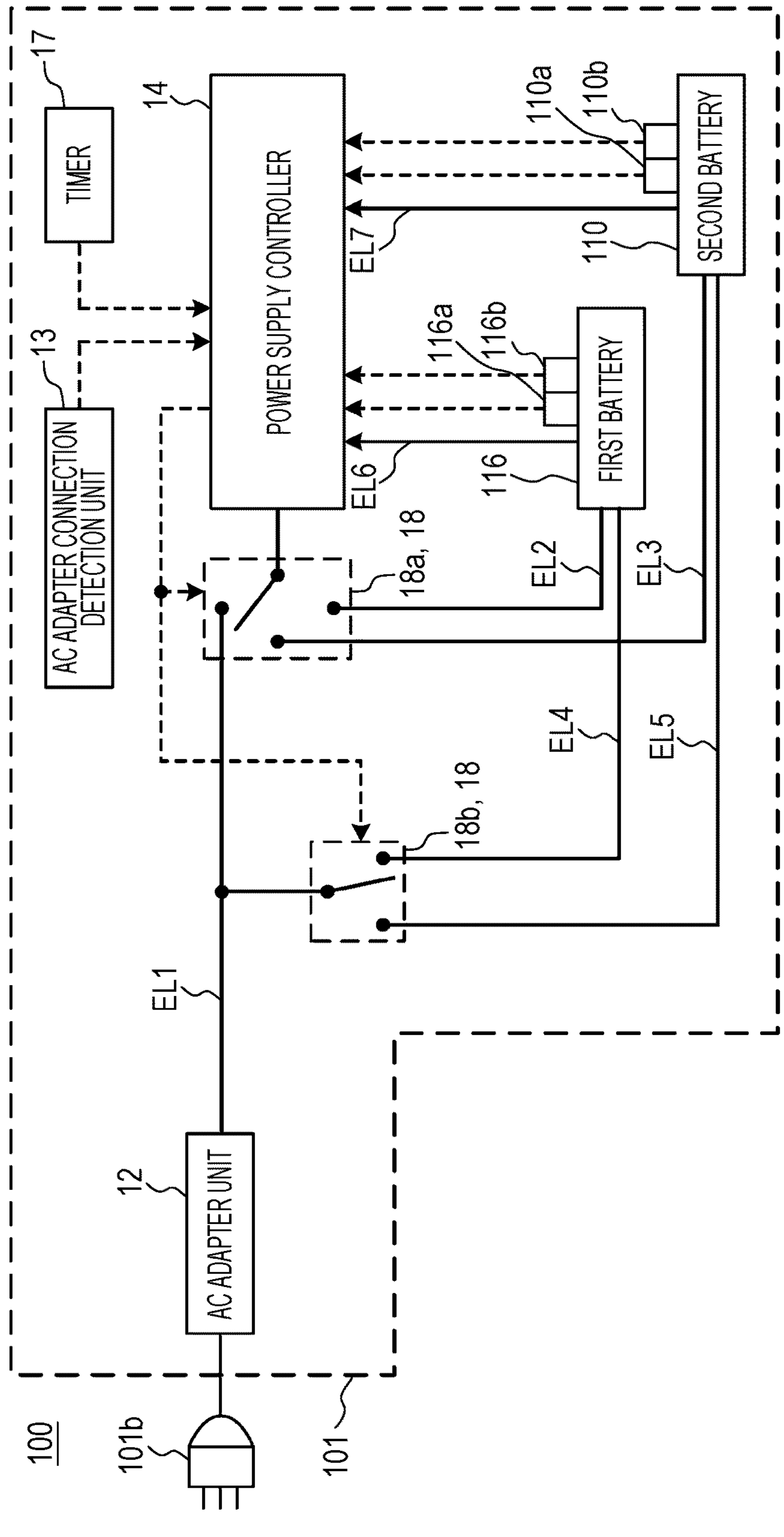
FIG. 14 is a block diagram illustrating a charge/discharge switching mechanism of an ultrasonic diagnostic system according to Modification 2 of the embodiment.

FIG. 14 is a block diagram illustrating a charge/discharge switching mechanism of an ultrasonic diagnostic system 100 according to Modification 2 of the present embodiment.

The ultrasonic diagnostic system 100 includes the ultrasonic diagnostic apparatus 101 and does not include the cart 102. Both of the first battery 116 and the second battery 110 are built-in batteries of the ultrasonic diagnostic apparatus 101.

Even if the plurality of prepared batteries is all built-in batteries as in Modification 2, the functions and effects described in the above embodiment can be realized.

<Modification 3>

Figure 15:
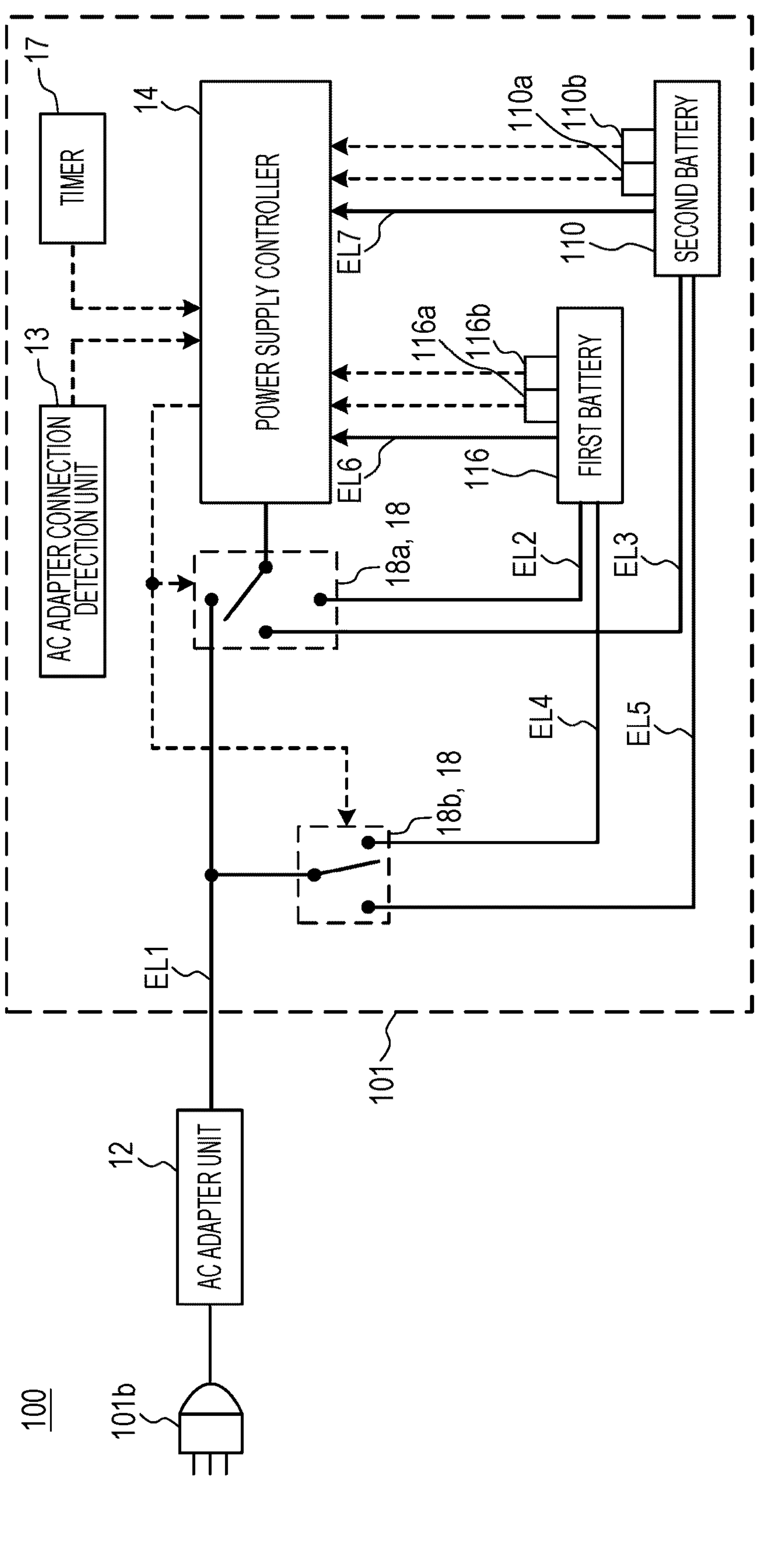
FIG. 15 is a block diagram illustrating a charge/discharge switching mechanism of an ultrasonic diagnostic system according to Modification 3 of the embodiment.

FIG. 15 is a block diagram illustrating a charge/discharge switching mechanism of an ultrasonic diagnostic system 100 according to Modification 3 of the present embodiment.

The ultrasonic diagnostic system 100 includes the ultrasonic diagnostic apparatus 101 and does not include the cart 102. Both of the first battery 116 and the second battery 110 are built-in batteries of the ultrasonic diagnostic apparatus 101. In addition, the power cable 101*a* (see FIGS. 1 and 2) is not integrated with the ultrasonic diagnostic apparatus 101 and is an accessory, and thus the ultrasonic diagnostic apparatus 101 does not include the AC adapter unit 12 included in the power cable 101*a*.

Even in a configuration in which the AC adapter unit 12 is not built in the ultrasonic diagnostic apparatus 101 as in Modification 3, the functions and effects described in the above embodiment can be realized.

<Modification 4>

Figure 16:
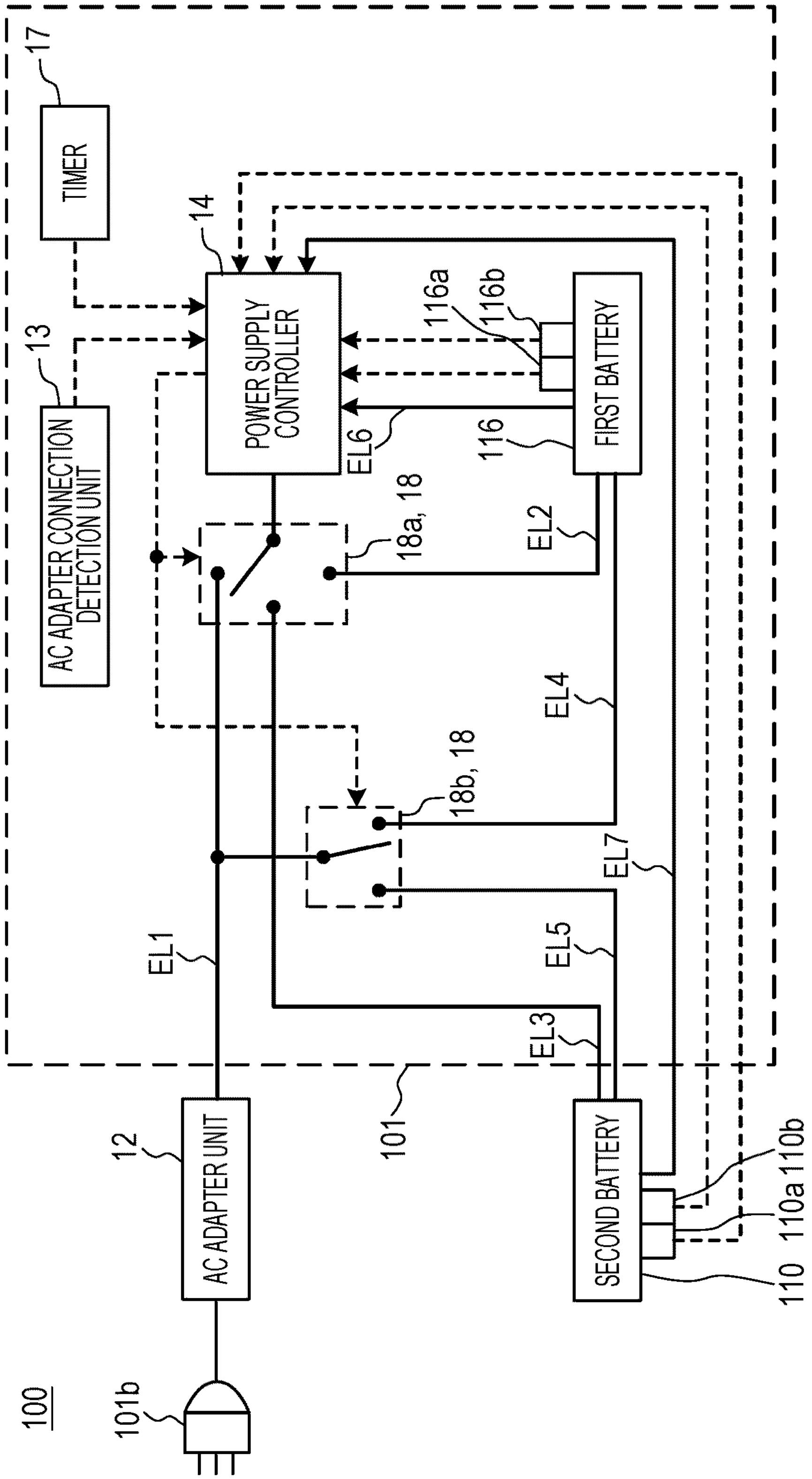
FIG. 16 is a block diagram illustrating a charge/discharge switching mechanism of an ultrasonic diagnostic system according to Modification 4 of the embodiment.

FIG. 16 is a block diagram illustrating a charge/discharge switching mechanism of an ultrasonic diagnostic system 100 according to Modification 4 of the present embodiment.

The ultrasonic diagnostic system 100 includes the ultrasonic diagnostic apparatus 101 and does not include the cart 102. While the first battery 116 is a built-in battery of the ultrasonic diagnostic apparatus 101, the second battery 110 is an external battery detachable from the ultrasonic diagnostic apparatus 101. In addition, the power cable 101*a* (see FIGS. 1 and 2) is not integrated with the ultrasonic diagnostic apparatus 101 and is an accessory, and thus the ultrasonic diagnostic apparatus 101 does not include the AC adapter unit 12 included in the power cable 101*a*.

As in Modification 4, in a case where the second battery 110 is an external battery that is not built in the cart 102 dedicated to the ultrasonic diagnostic apparatus 101, it may be a general-purpose battery. Even in a case where a general-purpose battery is used, in a case where the battery is externally attached to the ultrasonic diagnostic apparatus 101 so as to function as a power source of the ultrasonic diagnostic apparatus 101, the functions and effects described in the above embodiment can be realized.

The ultrasonic diagnostic system according to an embodiment of the present invention can be suitably used as a portable ultrasonic diagnostic system.

According to an embodiment of the present invention, a plurality of batteries prepared as a power source of an ultrasonic diagnostic apparatus can be efficiently charged.

Although embodiments of the present invention have been described and illustrated in detail, the disclosed embodiments are made for purposes of illustration and example only and not limitation. The scope of the present invention should be interpreted by terms of the appended claims. Various modifications and changes can be made to the specific examples described in the above embodiments within the scope of the gist of the present invention described in the claims.

What is claimed is:

1. An ultrasonic diagnostic system comprising:

a plurality of batteries including a first battery and a second battery that function as a power source of an ultrasonic diagnostic apparatus; and a hardware processor that performs individual charge and discharge control of the plurality of batteries;

wherein the hardware processor is configured to:

select one of the first and second batteries as a charge target battery, select the other of the first and second batteries as a discharge source, and perform control to charge the selected charge target battery using discharge power from the selected discharge source and supply power from an external power supply other than the selected discharge source, wherein:

the first battery is selectable as the discharge source for charging the second battery, and the second battery is selectable as the discharge source for charging the first battery, each of the first battery and the second battery is provided with independent charge and discharge paths, the charge path of the first battery includes a first path connectable to an external power supply and a second path connectable to the discharge path of the second battery, the charge path of the second battery includes a third path connectable to the external power supply and a fourth path connectable to the discharge path of the first battery, and the system further comprises a switch unit which is configured to:

switchably connect the external power supply to either the charge path of the first battery or the charge path of the second battery, and switchably connect the discharge path of the first battery to the charge path of the second battery, or the discharge path of the second battery to the charge path of the first battery.

2. The ultrasonic diagnostic system according to claim 1, wherein the first battery is built in the ultrasonic diagnostic apparatus, and the second battery is provided outside the ultrasonic diagnostic apparatus.

3. The ultrasonic diagnostic system according to claim 2, wherein the second battery is built in a cart to which the ultrasonic diagnostic apparatus is detachable.

4. The ultrasonic diagnostic system according to claim 2, wherein the hardware processor prioritizes individual charging of the first battery over individual charging of the second battery.

5. The ultrasonic diagnostic system according to claim 1, wherein the hardware processor selects one of the first and second batteries as the charge target battery based on a remaining capacity of each of the plurality of batteries.

6. The ultrasonic diagnostic system according to claim 1, wherein the hardware processor selects one of the first and second batteries as the charge target battery based on a degradation degree of each of the plurality of batteries.

7. The ultrasonic diagnostic system according to claim 1, wherein the hardware processor selects one of the first and second batteries as the charge target battery based on an unused time of each of the plurality of batteries.

8. An ultrasonic diagnostic system comprising:

a plurality of batteries including a first battery and a second battery that function as a power source of an ultrasonic diagnostic apparatus;

a hardware processor that performs individual charge and discharge control of the plurality of batteries; and a switch unit which is configured to:

switchably connect an external power supply to either a charge path of the first battery or a charge path of the second battery, and switchably connect (i) a discharge path of the first battery to the charge path of the second battery to enable charging of the second battery with discharge power output from the first battery, or (ii) a discharge path of the second battery to the charge path of the first battery to enable charging of the first battery with discharge power output from the second battery.

* * * * *